(12) United States Patent
Oomura

(10) Patent No.: US 8,882,480 B2
(45) Date of Patent: Nov. 11, 2014

(54) OIL PUMP WITH AIR VENT STRUCTURE

(75) Inventor: Tomohiro Oomura, Fuji (JP)

(73) Assignees: Jatco Ltd., Fuji-shi (JP); Nissan Motor Co., Ltd., Yokohama-shi (JP)

( * ) Notice: Subject to any disclaimer, the term of this patent is extended or adjusted under 35 U.S.C. 154(b) by 646 days.

(21) Appl. No.: 13/013,205

(22) Filed: Jan. 25, 2011

(65) Prior Publication Data
US 2011/0194959 A1    Aug. 11, 2011

(30) Foreign Application Priority Data

Feb. 9, 2010 (JP) ................................. 2010-026220

(51) Int. Cl.
*F04B 39/00* (2006.01)
*F16H 61/00* (2006.01)
*F16H 57/04* (2010.01)

(52) U.S. Cl.
CPC .... *F16H 61/0031* (2013.01); *F16H 2061/0037* (2013.01); *F16H 57/0436* (2013.01); *F16H 57/0446* (2013.01); *F16H 57/0443* (2013.01)
USPC ........... 417/435; 417/437; 417/440; 475/159; 74/606 R

(58) Field of Classification Search
USPC ......... 417/279, 437, 296, 286, 287, 435, 440; 418/61.3, 160, 166, 171, 75–76, 78, 418/83, 84, 95; 184/126, 27.1, 27.3; 137/565.33, 563, 601.2; 74/606 R, 467, 74/468; 475/159, 160
See application file for complete search history.

(56) References Cited

U.S. PATENT DOCUMENTS

| 2,989,951 | A | * | 6/1961 | Charlson ........................ 418/167 |
| 3,435,845 | A | * | 4/1969 | Hebner .......................... 137/563 |
| 3,824,041 | A | * | 7/1974 | Rystrom ........................ 417/310 |
| 4,413,960 | A | * | 11/1983 | Specht ............................ 418/19 |
| 5,476,374 | A | * | 12/1995 | Langreck ....................... 418/171 |
| 5,807,090 | A | | 9/1998 | Agner |
| 6,152,716 | A | | 11/2000 | Agner |
| 6,481,990 | B2 | * | 11/2002 | Wong et al. ..................... 418/82 |
| 2008/0308355 | A1 | * | 12/2008 | Kakinami et al. ............. 184/27.2 |
| 2009/0082153 | A1 | * | 3/2009 | Fujikawa et al. .............. 475/128 |

FOREIGN PATENT DOCUMENTS

| DE | 36 39 122 A1 | 11/1987 | |
| DE | 196 31 846 A1 | 2/1997 | |
| JP | 2003-239869 A | 8/2003 | |
| JP | 2005-315271 A | * 10/2005 | .............. F16H 61/00 |

* cited by examiner

*Primary Examiner* — Devon Kramer
*Assistant Examiner* — Joseph Herrmann
(74) *Attorney, Agent, or Firm* — Foley & Lardner LLP

(57) ABSTRACT

In an oil pump for an automatic transmission, a suction port is adapted to be connected to a first suction passage. The first suction passage is arranged in parallel with a second suction passage connected to an auxiliary pump. The first and second suction passages branch from an upstream suction passage leading to an oil strainer. A discharge outlet is adapted to be connected to a first discharge passage. An air vent hole is disposed downstream of the suction port and upstream of the discharge outlet. A communication passage is connected to the air vent hole and adapted to reach a predetermined oil level in an oil pan so as to communicate the air vent hole with inside of oil in the oil pan.

6 Claims, 7 Drawing Sheets

OIL PUMP WITH AIR VENT STRUCTURE

BACKGROUND OF THE INVENTION

The present invention relates to an oil pump for an automatic transmission, which oil pump is provided with an air vent structure.

In a motor vehicle provided with a torque converter and a typical automatic transmission, oil is supplied by an oil pump driven by a sleeve extending from an impeller fixed to an output shaft of the transmission. This oil pump sucks up oil from an oil pan located below a transmission case, through a suction passage provided with a strainer, and discharges oil to lubricated portions and control valves of the transmission through a discharge outlet and a discharge passage.

In a hybrid drive vehicle, the transmission may be provided with the oil pump as a main pump, and an auxiliary pump for supplying a sufficient amount of oil to the lubricated portions while the main pump is not driven by an engine. The auxiliary pump is connected to a suction passage and a discharge passage which are arranged in parallel with the suction passage and discharge passage of the main pump.

FIG. 7 shows a reference example in which a suction passage is provided with a strainer 107 at its tip, and strainer 107 has an opening 108 located below a liquid level of oil F100 in an oil pan 103. In the reference example, situations are possible in which when a vehicle is decelerating rapidly, oil F100 in oil pan 103 moves in a vehicle travel direction so that liquid level W100 is inclined with respect to oil pan 103, the opening 108 of strainer 107 is exposed above liquid level 100, and strainer 107 sucks air as shown by an arrow. The suction of air can lower the pump efficiency, and adversely affect normal operation of control valves because oil discharged through a discharge outlet is mixed with air.

Japanese Patent Application Publication No. 2003-239869 discloses an oil pump intended for solving the to problem described above. In this oil pump, first and second grooves are formed between a drive shaft and a bearing. The first groove extends in the axial direction and communicates at one end with a discharge port. The second groove extends in the axial direction and communicates at one end with the outside of the oil pump. The first and second grooves are separated and arranged to partly overlap with each other in the axial direction, so that air escapes from the inside of the oil pump to the outside through the first and second grooves and an intermediate clearance at the overlap section between the drive shaft and bearing.

SUMMARY OF THE INVENTION

If the technique according to Japanese Patent Application Publication No. 2003-239869 is applied to the main pump of the hybrid drive vehicle described above, it is possible that when the auxiliary pump is operating instead of the main pump, oil in the main pump is sucked by the auxiliary pump because of parallel connection of the suction passages and discharge passages of the main and auxiliary pumps so that the main pump becomes vacant, and thereafter, air is sucked inversely from the outside to the inside of the main pump through the air vent path. Namely, although the air vent path is provided for ventilation of sucked air, the provision of the air vent path may cause a trouble that air sucked through the air vent path of the main pump is sent by the auxiliary pump to the control valves and lubricated portions.

In view of the foregoing, it is desirable to provide an oil pump with an air vent structure which is capable of preventing air from being sucked while an auxiliary pump is operating.

According to one aspect of the present invention, an oil pump for an automatic transmission, comprises: a suction port adapted to be connected to a first suction passage, wherein the first suction passage is arranged in parallel with a second suction passage connected to an auxiliary pump, and wherein the first and second suction passages branch from an upstream suction passage leading to an oil strainer; a discharge outlet adapted to be connected to a first discharge passage; an air vent hole disposed downstream of the suction port and upstream of the discharge outlet; and a communication passage connected to the air vent hole and adapted to reach a predetermined oil level in an oil pan so as to communicate the air vent hole with inside of oil in the oil pan. The oil pump may be constructed so that: the first discharge passage is arranged in parallel with a second discharge passage connected to the auxiliary pump; the first and second discharge passages join at a junction into a downstream discharge passage; the first discharge passage is provided with a first unidirectional valve for opening and closing the first discharge passage, wherein the first unidirectional valve is arranged upstream of the junction; and the second discharge passage is provided with a second unidirectional valve for opening and closing the second discharge passage, wherein the second unidirectional valve is arranged upstream of the junction.

DETAILED DESCRIPTION OF THE INVENTION

The following describes first and second embodiments of the present invention, each of which is applied to an automatic transmission of a hybrid electric vehicle.

Figure 1:
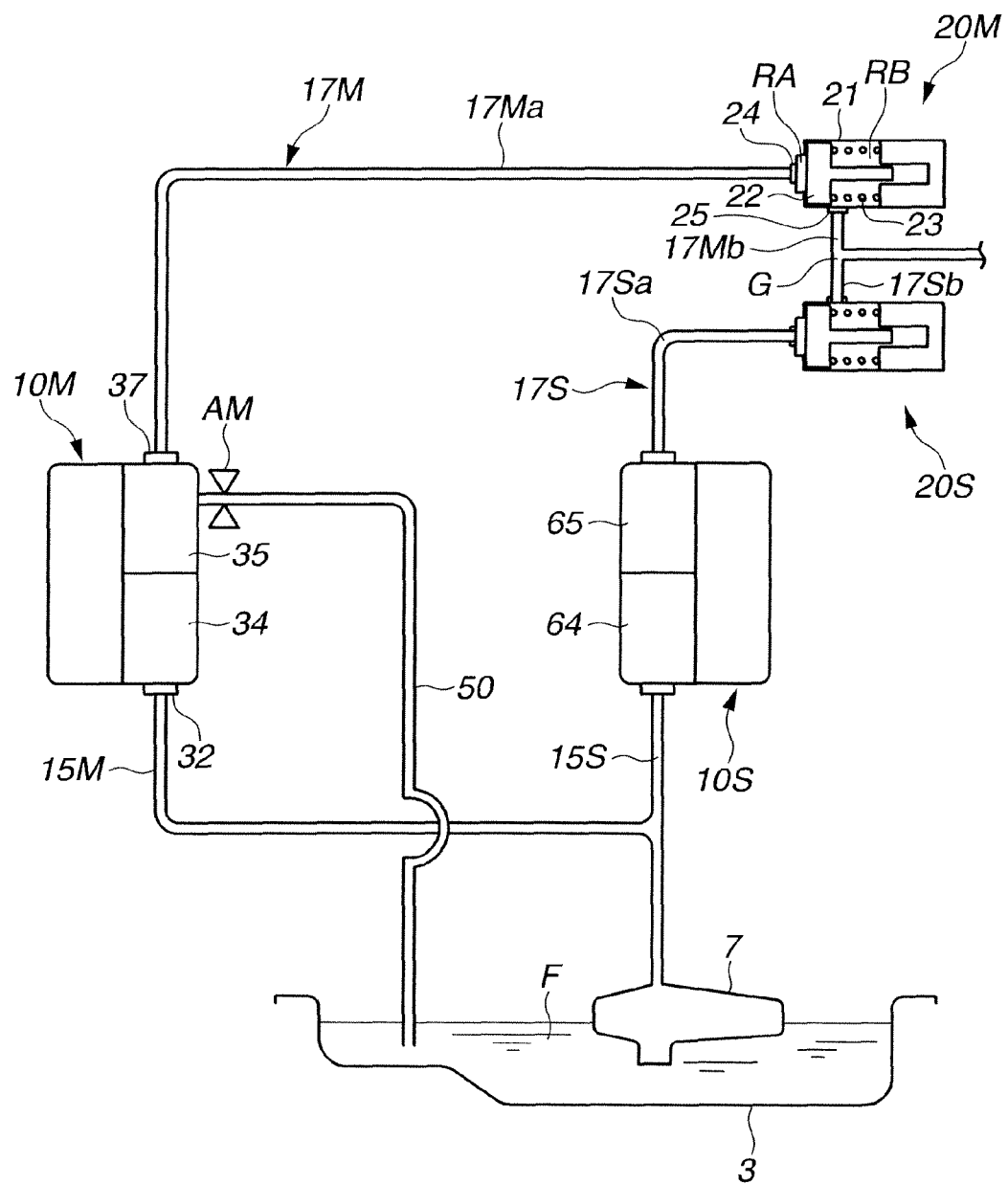
FIG. 1 is a schematic diagram showing a hydraulic circuit of an oil pump system according to present embodiments of the present invention.

<First Embodiment> The hybrid electric vehicle is provided with two driving power sources, one of which is an internal combustion engine connected to an automatic transmission through a torque converter, the other of which is an electric motor. The vehicle is driven in a drive mode based on the engine, a drive mode based on the electric motor, or a drive mode based on both of them. Among these drive modes, one is selected according to driving states of the vehicle. The automatic transmission is provided with a main pump 10M and an auxiliary pump 10S for lubricating the inside of the transmission, as shown in FIG. 1. Main pump 10M is connected to a main suction passage 15M, and auxiliary pump 10S is connected to an auxiliary suction passage 15S. Suction passages 15M, 15S is branched from an upstream suction passage leading to a strainer 7. Main pump 10M is connected to a main discharge passage 17M, and auxiliary pump 10S is connected to an auxiliary discharge passage 17S. Discharge passages 17M, 17S join at a junction "G" into a downstream discharge passage leading to lubricated portions and control valves.

Main pump 10M is arranged between the torque converter and the automatic transmission. As detailed below, main pump 10M includes an oil pump cover 30, a pump housing 13, and a pump gear. Pump housing 13 is layered on and fixed to oil pump cover 30, defining therebetween a pump chamber in which the pump gear is arranged. The pump gear is accommodated in a recess formed in pump housing 13.

Main pump 10M is mounted so that pump housing 13 faces the torque converter, and oil pump cover 30 faces a transmission case 1 and is attached to a front end portion of transmission case 1. The pump gear includes an inner gear and an outer gear which are eccentric with respect to one another. The inner gear is directly rotated by a sleeve that extends from an impeller of the torque converter along a major axis of the automatic transmission.

Auxiliary pump 10S is constructed similar to main pump 10M. Auxiliary pump 10S is not required to extend along the major axis of the automatic transmission, but may be arranged to extend in another direction. Auxiliary pump 10S is rotationally driven by an electric motor powered by a battery, in contrast to main pump 10M that is driven by the impeller powered by the engine. As shown in FIG. 1, main pump 10M and auxiliary pump 10S communicate with an oil pan 3 through the strainer 7 and suction passages 15M, 15S, respectively. Main discharge passage 17M and auxiliary discharge passage 17S join into a downstream discharge passage through which the control valves and lubricated portions can be supplied with oil by any one of main pump 10M and auxiliary pump 10S.

Main discharge passage 17M of main pump 10M is provided with a first accumulator 20M that is arranged upstream of junction G. Similarly, auxiliary discharge passage 17S of auxiliary pump 105 is provided with a second accumulator 20S that is arranged upstream of junction G. First accumulator 20M includes a cylinder 21, and a piston 22. Piston 22 defines a charging chamber "RA" in cylinder 21. Charging chamber RA is provided with a charging port 24 that is connected to an upstream portion 17Ma (or a portion closer to main pump 10M) of main discharge passage 17M. Piston 22 is biased by a spring 23 in a direction to compress the charging chamber RA. A downstream portion 17Mb (or a portion closer to junction G) of main discharge passage 17M is connected to a back pressure port 25 of a back pressure chamber "RB" that is opposite to charging chamber RA with respect to piston 22. Downstream portion 17Mb communicates with back pressure chamber RB through back pressure port 25, when charging chamber RA is supplied with no fluid pressure.

The thus-constructed first accumulator 20M disconnects the upstream portion 17Ma and downstream portion 17Mb from one another so as to close or shut off the main discharge passage 17M when charging chamber RA is supplied with no fluid pressure, and connects the upstream portion 17Ma and downstream portion 17Mb to one another so as to open the main discharge passage 17M when charging chamber RA is supplied with fluid pressure so that piston 22 travels to connect back pressure port 25 to charging chamber RA. Second accumulator 20S is constructed similar to first accumulator 20M. The back pressure port 25 of each accumulator 20M, 20S is connected to downstream portion 17Mb or 17Sb of discharge passage 17M or 17S, wherein downstream portions 17Mb and 17Sb join into the downstream discharge passage.

When main pump 10M is operating, oil flows into the charging chamber RA of first accumulator 20M, and then flows out to the downstream portion 17Mb of main discharge passage 17M. At this moment, this oil also flows from first accumulator 20M through the junction G to the back pressure chamber RB of second accumulator 20S. This prevents piston 22 of second accumulator 20S from traveling, and thereby disconnects the charging port 24 and back pressure port 25 of second accumulator 20S from one another.

On the other hand, when main pump 10M is at rest and auxiliary pump 10S is operating, oil flows into the charging chamber RA of second accumulator 20S, and then flows out to downstream portion 17Sb. At this moment, this oil also flows from second accumulator 20S through the junction G to the back pressure chamber RB of first accumulator 20M. This prevents piston 22 of first accumulator 20M from traveling, and thereby disconnects the charging port 24 and back pressure port 25 of first accumulator 20M from one another. In this way, first accumulator 20M and second accumulator 20S function as check valves or unidirectional valves.

Figure 2:
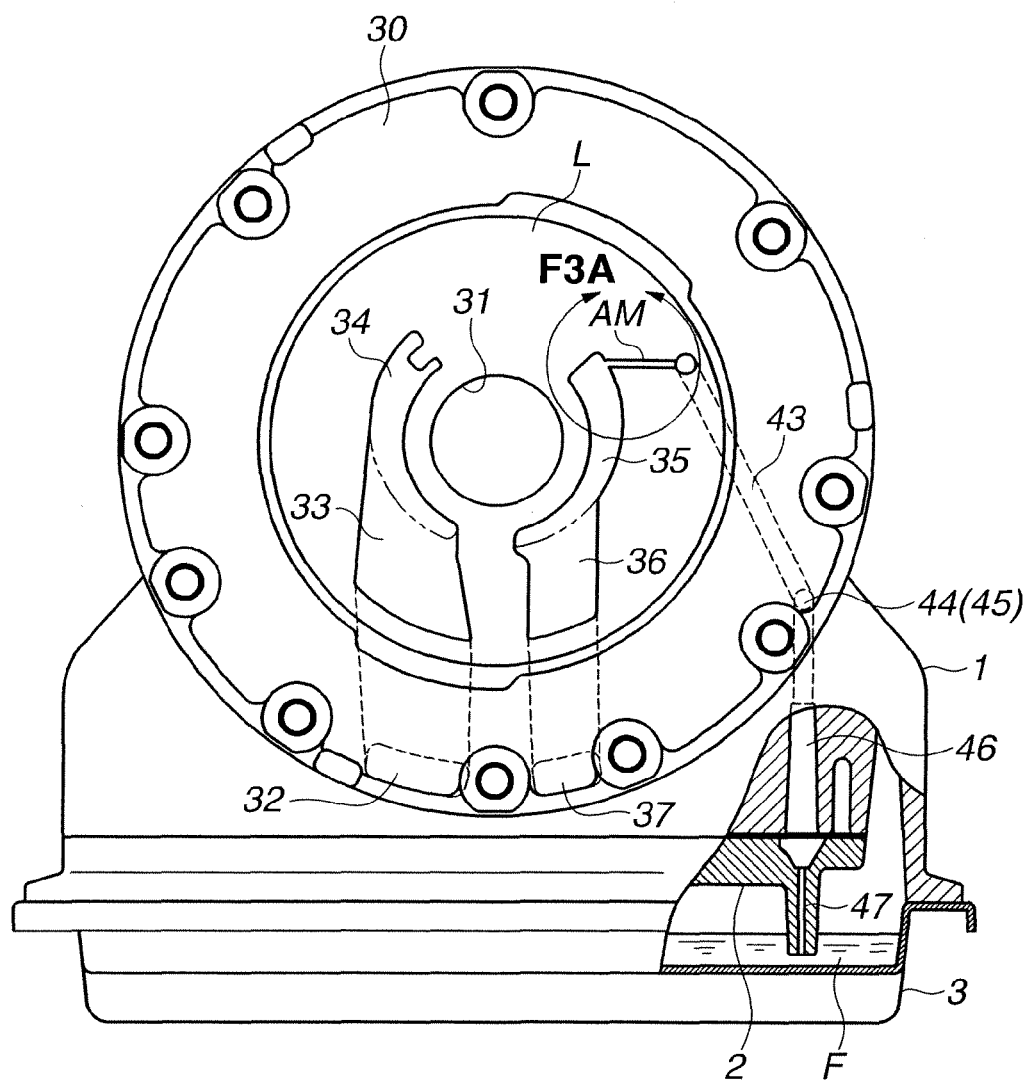
FIG. 2 is a front view of an oil pump cover according to a first embodiment of the present invention.

FIG. 2 shows a front view of oil pump cover 30 of main pump 10M from the torque converter. Oil pump cover 30 is in the form of a circular disc, which is formed with a shaft hole 31 at its center through which a main shaft of a transmission mechanism. A surface of oil pump cover 30 which faces the pump housing 13 is formed with a suction port 34 and a discharge port 35 on left and right sides of shaft hole 31, respectively, as viewed in FIG. 2. Suction port 34 faces and communicates with the pump chamber, and extends in the circumferential direction along the periphery of shaft hole 31 by a predetermined length. Discharge port 35 faces and communicates with the pump chamber, and extends similarly by a predetermined length. Suction port 34 is connected to a suction inlet 32 leading to main suction passage 15M, and discharge port 35 is connected to a discharge outlet 37 leading to main discharge passage 17M. Suction inlet 32 and discharge outlet 37 are formed in a back surface of oil pump cover 30 facing the transmission mechanism, and located close to the outside periphery of the back surface. An upper end of discharge port 35 as viewed in FIG. 2 is a beginning end at which each tooth of the pump gear starts to overlap with discharge port 35 while the pump gear is rotating in the pump chamber. A lower end of discharge port 35 as viewed in FIG. 2 is a terminating end at which each tooth of the pump gear departs from discharge port 35 while the pump gear is rotating in the pump chamber.

Suction port 34 communicates with suction inlet 32 through a suction passage 33, whereas discharge port 35 communicates with discharge outlet 37 through a discharge passage 36. Suction passage 33 extends substantially straight downward from the lower end of suction port 34. Similarly, discharge passage 36 extends substantially straight downward from the lower end of discharge port 35. Suction inlet 32 is connected to main suction passage 15M (see FIG. 1), wherein main suction passage 15M has an opening at an end surface of transmission case 1 which faces the suction inlet 32. Main suction passage 15M leads to strainer 7 in oil pan 3. In this construction, oil is sucked from oil pan 3 to the pump chamber through the suction port 34. Discharge outlet 37 is connected to main discharge passage 17M (see FIG. 1), wherein main discharge passage 17M has an opening at the end surface of transmission case 1 which faces the discharge outlet 37. In this construction, oil is discharged from the pump chamber through the discharge port 35 so that the oil is supplied through main discharge passage 17M to the control valves and lubricated portions.

Figure 3A:
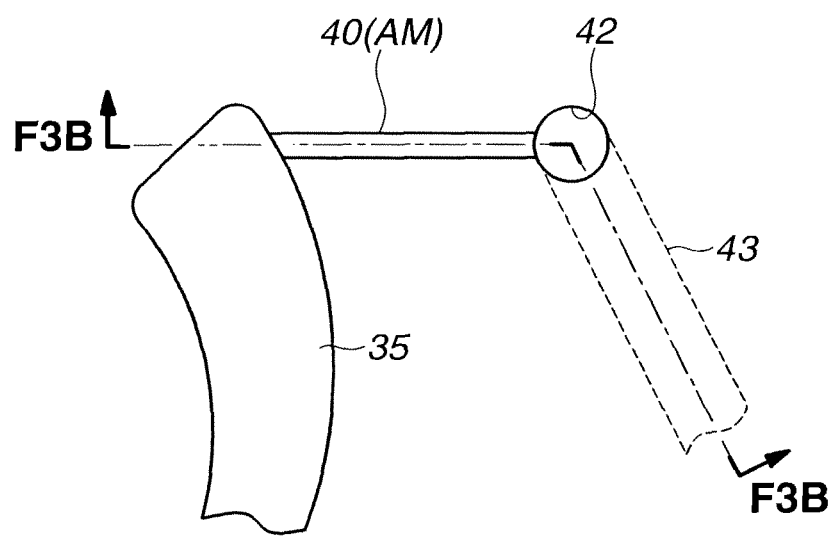
FIG. 3A is a partial enlarged view of the oil pump cover of FIG. 2, showing a discharge port and surroundings.
Figure 3B:
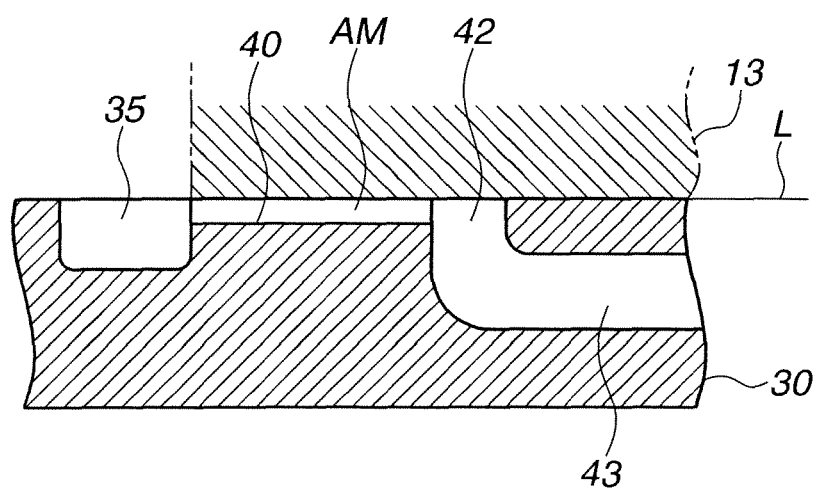
FIG. 3B is a sectional view of the oil pump cover taken along the plane indicated by F3B-F3B in FIG. 3A.

The beginning end portion of discharge port 35 is provided with an air vent hole "AM" that communicates with discharge port 35. FIG. 3A is a partial enlarged view of part of oil pump cover 30 indicated by a circle F3A in FIG. 2, showing the discharge port 35 and surroundings. FIG. 3B is a sectional view of oil pump cover 30 taken along the plane indicated by F3B-F3B in FIG. 3A. A contact surface L of oil pump cover 30 which abuts on pump housing 13 is formed with a groove 40 which communicates with discharge port 35 and extends from discharge port 35. The width and depth of groove 40 are smaller than or equal to 0.2 mm in this example. When covered by pump housing 13, groove 40 forms a choke hole having a small rectangular or square cross-section. The choke hole is a hole that is longer than an orifice so that the hole is resistant to flow of viscous oil. This choke hole forms the air vent hole AM that allows air to exit from discharge port 35 to the outside, which air is sucked to main pump 10M and discharged to discharge port 35.

Groove 40 extends outwardly away from shaft hole 31 and has an outside end connected to a connection passage 42 that extends in the axial direction from the contact surface L that abuts on pump housing 13. Connection passage 42 does not pass through the oil pump cover 30, but extends within the thickness of oil pump cover 30. The opening of connection passage 42 on the contact surface L is closed by pump housing 13 that is layered on oil pump cover 30. The wall of oil pump cover 30 is formed with a first fluid passage 43 that communicates with a tip portion of connection passage 42, and extends substantially in parallel to the contact surface L, and reaches the neighborhood of the periphery of oil pump cover 30. First fluid passage 43 is further connected to a second fluid passage 44 that extends in the axial direction, and has an opening on the back surface of oil pump cover 30, as shown in FIG. 4.

Air vent hole AM (groove 40) can be formed to extend long along the contact surface L of oil pump cover 30 in contact with pump housing 13. This eliminates the necessity to consider the resistance of connection passage 42, first fluid passage 43 and second fluid passage 44, and thereby makes it easy to form these passages with larger diameters than air vent hole AM. The opening of second fluid passage 44 at the back surface of oil pump cover 30 faces an opening of a third fluid passage 45 that is formed in transmission case 1 as detailed below.

Connection passage 42, first fluid passage 43 and second fluid passage 44, which extend in different directions inside oil pump cover 30, may be formed by casting with cores. If such casting is difficult, these passages may be formed in different manners, for example, by forming a hole by drilling from the outside peripheral surface of oil pump cover 30, which hole leads to connection passage 42, and then closing the opening of the hole with a plug so as to form the first fluid passage 43, and then forming the second fluid passage 44 by drilling from the back surface toward first fluid passage 43.

Figure 4:
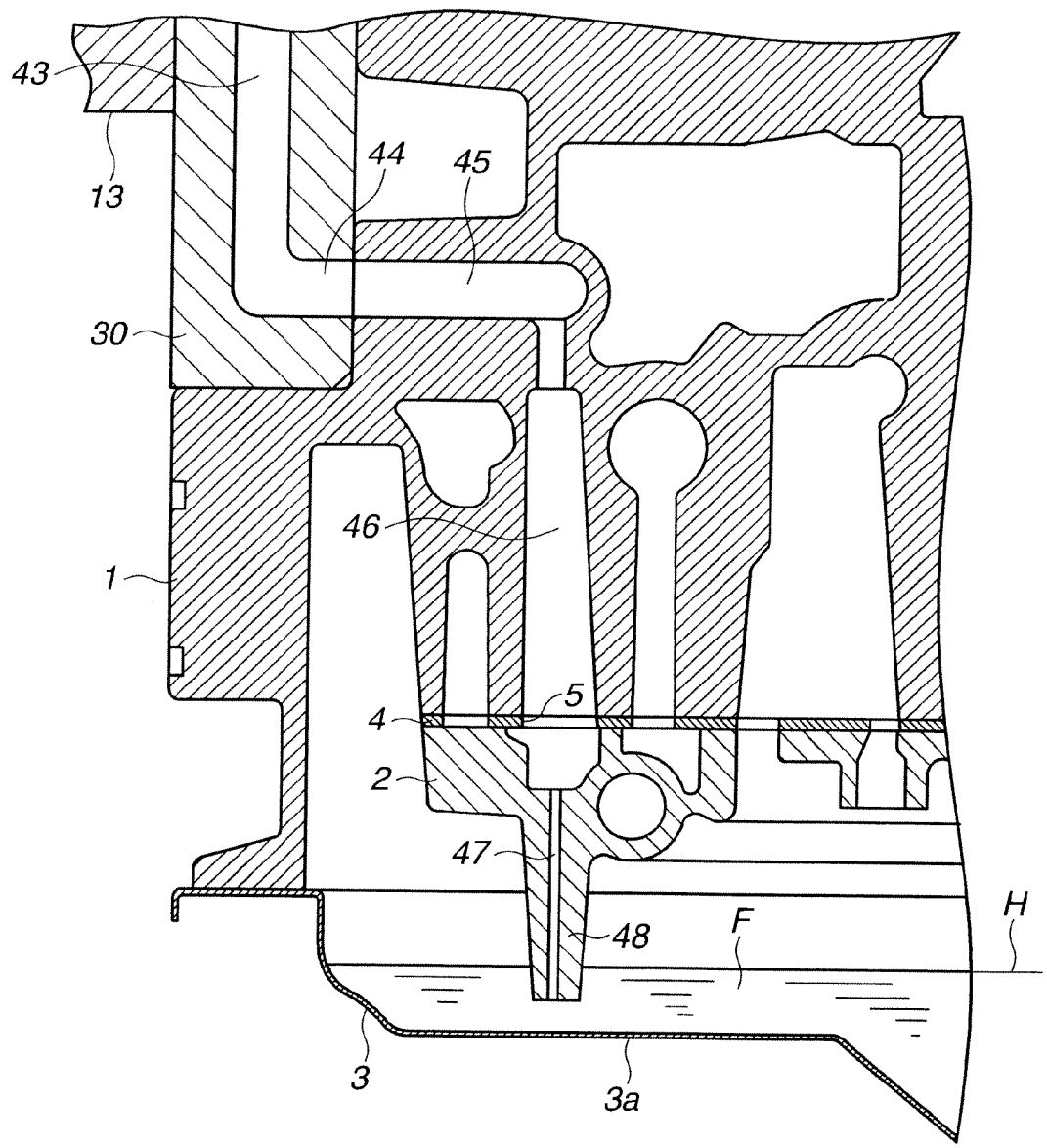
FIG. 4 is a sectional view of a structure including a transmission case and a control valve body, which is formed with a communication passage according to the first embodiment.

FIG. 4 is a sectional view of a structure including the transmission case 1 and a control valve body 2, which is formed with a communication passage. Third fluid passage 45 extends in the axial direction, and has an opening at the front end surface of transmission case 1 to which oil pump cover 30 is attached. Transmission case 1 is formed also with a fourth fluid passage 46 that communicates with third fluid passage 45, extends in the vertical direction, and has an opening at a lower end surface of transmission case 1 to which control valve body 2 is attached.

Control valve body 2 is attached to transmission case 1, wherein a seal gasket 4 is disposed between control valve body 2 and transmission case 1. Control valve body 2 is formed with a fifth fluid passage 47. Fifth fluid passage 47 has an opening at an upper surface of control valve body 2 which faces transmission case 1, and faces the opening of fourth fluid passage 46, and extends downward as shown in FIG. 4. Naturally, seal gasket 4 is formed with a hole 5 which allows fluid communication between fourth fluid passage 46 and fifth fluid passage 47. Control valve body 2 includes a rod projection 48 that extends to the neighborhood of a bottom wall 3a of oil pan 3. Fifth fluid passage 47 extends through inside of rod projection 48, and has an opening at a lower end surface of rod projection 48. The lower end of rod projection 48 is located below a lowest liquid level H of oil F in oil pan 3. The lowest liquid level is, for example, a liquid level under condition that a vehicle is on a level road, and an oil pan is supplied with an amount of oil required to prevent a strainer from sucking air even at vehicle start on a road having a predetermined gradient. Connection passage 42 and first to fifth fluid passages 43 to 47 form a communication passage 50 that communicates the air vent hole AM with oil F in oil pan 3.

Third fluid passage 45, fourth fluid passage 46 and fifth fluid passage 47 may be formed by casting or drilling similar to connection passage 42, first fluid passage 43 and second fluid passage 44. These passages may be formed by combination of casting and drilling. In the case of formation based on casting, it is preferable that the opening of each passage that faces and is connected to another passage of an opposite member is expanded radially as shown in FIG. 4 in which the lower end of fourth fluid passage 46 and the upper end of fifth fluid passage 47 are expanded radially, because this construction can absorb manufacturing deviation in position between the passages connected to each other.

In this embodiment, auxiliary pump 10S is provided with no air vent hole, because auxiliary pump 10S is driven by a different drive mechanism so that only a small amount of air is sucked, and pressed by hydraulic pressure toward the inside of the inner gear, and then forced to exit to the outside through a sealing portion which prevents atmospheric air from entering the pump. In contrast, main pump 10M is provided with the air vent hole AM, because the inner gear of main pump 10M is rotated by the sleeve extending from the impeller of the torque converter so that the inside of the inner gear of main pump 10M is applied with hydraulic pressure.

The first embodiment produces the following advantageous effects.

An oil pump (main pump 10M) for an automatic transmission, comprising: a suction port (34) adapted to be connected to a first suction passage (main suction passage 15M), wherein the first suction passage (15M) is arranged in parallel with a second suction passage (auxiliary suction passage 15S) connected to an auxiliary pump (10S), and wherein the first and second suction passages (15M, 15S) branch from an upstream suction passage leading to an oil strainer (7); a discharge outlet (37) adapted to be connected to a first discharge passage (main discharge passage 17M); an air vent hole (AM) disposed downstream of the suction port (34) and upstream of the discharge outlet (37); and a communication passage (50) connected to the air vent hole (AM) and adapted to reach a predetermined oil level (lowest liquid level H) in an oil pan (3) so as to communicate the air vent hole (AM) with inside of oil in the oil pan (3), serves to keep a condition that the air vent hole (AM) communicates with oil (F) in the oil pan (3) even when the oil pump (10M) is at rest and the auxiliary pump (10S) is operating, and thereby serves to prevent air from being sucked through the air vent hole (AM).

The oil pump wherein: the first discharge passage (main discharge passage 17M) is arranged in parallel with a second discharge passage (auxiliary discharge passage 17S) connected to the auxiliary pump (10S); the first and second discharge passages (17M, 17S) join at a junction (G) into a downstream discharge passage; the first discharge passage (17M) is provided with a first unidirectional valve (first accumulator 20M) for opening and closing the first discharge passage (17M), wherein the first unidirectional valve (20M) is arranged upstream of the junction (G); and the second discharge passage (17S) is provided with a second unidirectional valve (second accumulator 20S) for opening and closing the second discharge passage (17S), wherein the second unidirectional valve (20S) is arranged upstream of the junction (G), serves to close the discharge passage of one of the pumps when the other pump is operating, for example, close the first discharge passage (main discharge passage 17M) of the oil pump (main pump 10M) when the oil pump (main pump 10M) is at rest and the auxiliary pump (10S) is operating, and thereby prevent the oil of the inoperative pump upstream of the unidirectional valve (20M, 20S) from flowing out to the control valves and lubricated portions. This serves to keep for a long time a condition that the oil pump (main pump 10M) is fully charged with oil, and allow the oil pump (main pump 10M) to quickly start to operate in response to switching between the oil pump (main pump 10M) and auxiliary pump (10S).

The oil pump wherein: the first unidirectional valve (first accumulator 20M) is arranged to close in response to receipt of oil pressure from the second discharge passage (auxiliary discharge passage 17S), and open so as to communicate an upstream side (upstream portion 17Ma, charging chamber RA) of the first unidirectional valve (20M) with a downstream side (downstream portion 17Mb, back pressure chamber RB) of the first unidirectional valve (20M) in response to a condition that the upstream side (17Ma, RA) is higher in pressure than the downstream side (17Mb, RB) by a predetermined amount; and the second unidirectional valve (second accumulator 20S) is arranged to close in response to receipt of oil pressure from the first discharge passage (main discharge passage 17M), and open so as to communicate an upstream side (upstream portion 17Sa, charging chamber RA) of the second unidirectional valve (20S) with a downstream side (downstream portion 17Sb, back pressure chamber RB) of the second unidirectional valve (20S) in response to a condition that the upstream side (17Sa, RA) of the second unidirectional valve (20S) is higher in pressure than the downstream side (17Sb, RB) of the second unidirectional valve (20S) by a predetermined amount, serves to mechanically implement the shut-off operation by the back pressure that is supplied through the junction (G) from the discharge passage of an operating one of the pumps. This eliminates the necessity of provision of an electrical control circuit which controls switching operation between the main pump powered by the engine and the auxiliary pump powered by the motor.

The oil pump comprising a member (oil pump cover 30) adapted to be fixed to a transmission case (1) and formed with a discharge port (35), wherein: the transmission case (1) is coupled to a control valve body (2); and the communication passage (50) is formed to extend through inside of the transmission case (1) and the control valve body (2), is advantageous, because the communication passage (50) is provided without external piping so that this system is not subject to a further requirement in layout.

The oil pump comprising: an oil pump cover (30) formed with a discharge port (35); and a pump housing (13) layered on the oil pump cover (30) so as to define a pump chamber therebetween, wherein: the air vent hole (AM) is constituted by a groove (40) formed in the oil pump cover (30); and the groove (40) extends from the discharge port (35) along a surface of the oil pump cover (30) in contact with the pump housing (13), is advantageous in that the air vent hole (AM) can be provided with a length sufficient to function as an air vent hole.

Figure 5:
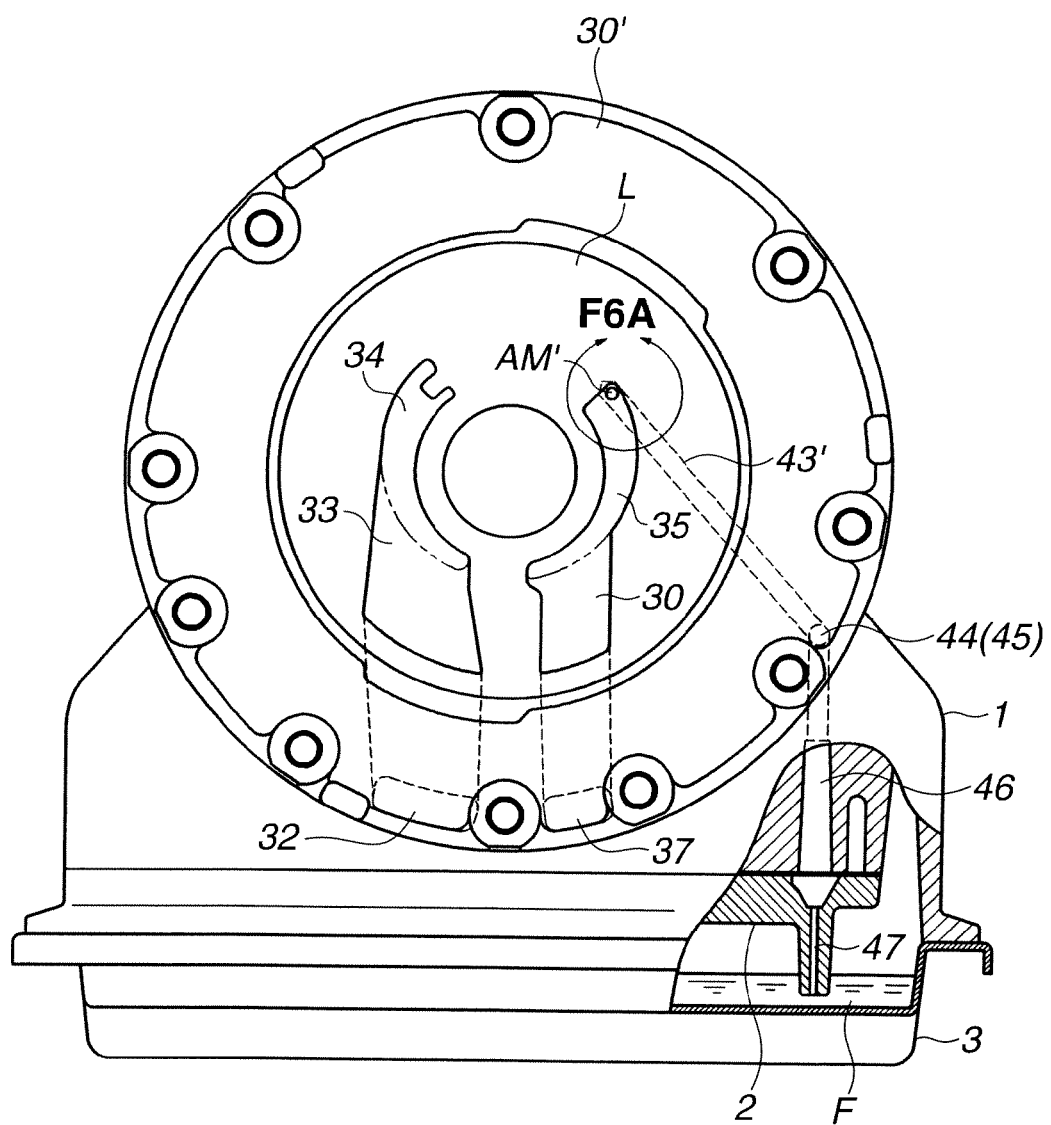
FIG. 5 is a front view of an oil pump cover according to a second embodiment of the present invention.

<Second Embodiment> The second embodiment differs from the first embodiment in that the air vent hole is in another form. Since only part of the oil pump cover is different, the same members or portions as in the first embodiment are given the same reference signs. FIG. 5 is a front view of an oil pump cover according to the second embodiment. The beginning end of discharge port 35 is provided with an air vent hole AM' that communicates with discharge port 35 and extends in the axial direction.

Figure 6A:
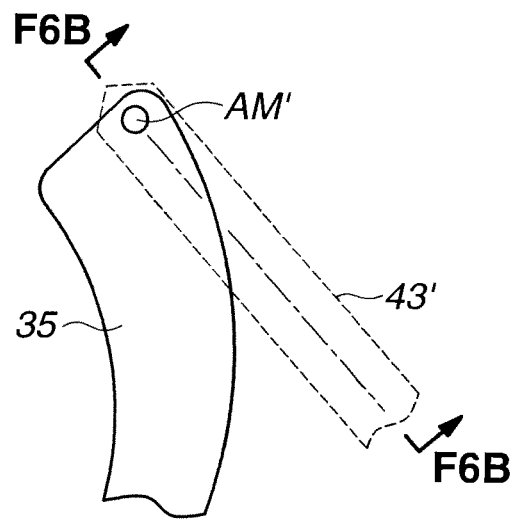
FIG. 6A is a partial enlarged view of the oil pump cover of FIG. 5, showing a discharge port and surroundings.
Figure 6B:
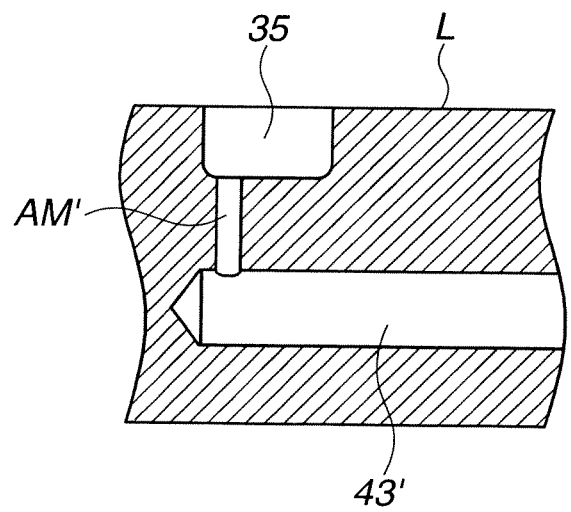
FIG. 6B is a sectional view of the oil pump cover taken along the plane indicated by F6B-F6B in FIG. 6A.
Figure 7:
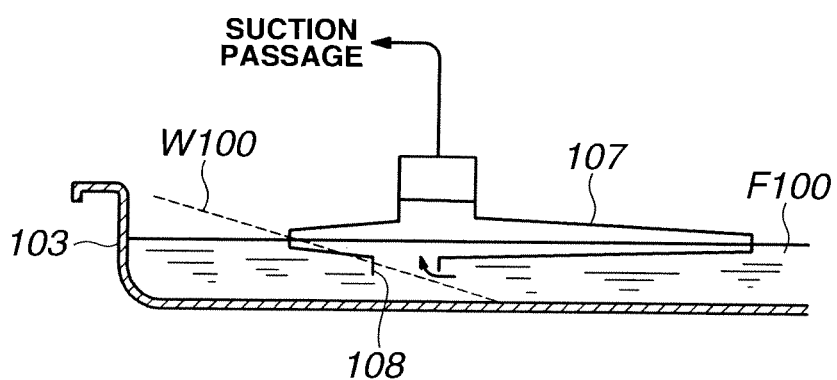
FIG. 7 is a diagram showing a reference example in which air is sucked up through a strainer.

FIG. 6A is a partial enlarged view of part of an oil pump cover 30' indicated by a circle 6A in FIG. 5, showing the discharge port 35 and surroundings. FIG. 6B is a sectional view of oil pump cover 30' taken along the plane indicated by F6B-F6B in FIG. 6A. An air vent hole AM' is a choke hole having a small circular cross-section whose diameter is smaller than or equal to 0.2 mm in this example. Air vent hole AM' allows air to pass through easily, but is resistant to flow of viscous oil. Air vent hole AM' is a recess formed in an oil pump cover 30', and extends within the thickness of oil pump cover 30'.

The wall of oil pump cover 30' is formed with a first fluid passage 43' that communicates with a tip portion of air vent hole AM', and extends substantially in parallel to the contact surface L, and reaches the neighborhood of the periphery of oil pump cover 30'. Second fluid passage 44 communicates with first fluid passage 43', and extends in the axial direction, and has an opening on the back surface of oil pump cover 30'. The remaining part of the system according to the second embodiment is constructed similar to the first embodiment. First fluid passage 43' and second to fifth fluid passages 44 to 47 form the communication passage 50 that communicates the air vent hole AM' with oil F in oil pan 3.

The second embodiment produces the following advantageous effects.

An oil pump (main pump 10M) for an automatic transmission, comprising: a suction port (34) adapted to be connected to a first suction passage (main suction passage 15M), wherein the first suction passage (15M) is arranged in parallel with a second suction passage (auxiliary suction passage 15S) connected to an auxiliary pump (10S), and wherein the first and second suction passages (15M, 15S) branch from an upstream suction passage leading to an oil strainer (7); a discharge outlet (37) adapted to be connected to a first discharge passage (main discharge passage 17M); an air vent hole (AM) disposed downstream of the suction port (34) and upstream of the discharge outlet (37); and a communication passage (50) connected to the air vent hole (AM) and adapted to reach a predetermined oil level (lowest liquid level H) in an oil pan (3) so as to communicate the air vent hole (AM') with inside of oil in the oil pan (3), serves to keep a condition that the air vent hole (AM') communicates with oil (F) in the oil pan (3) even when the oil pump (10M) is at rest and the auxiliary pump (10S) is operating, and thereby serves to prevent air from being sucked through the air vent hole (AM').

The oil pump wherein: the first discharge passage (main discharge passage 17M) is arranged in parallel with a second discharge passage (auxiliary discharge passage 17S) connected to the auxiliary pump (10S); the first and second discharge passages (17M, 17S) join at a junction (G) into a downstream discharge passage; the first discharge passage (17M) is provided with a first unidirectional valve (first accumulator 20M) for opening and closing the first discharge passage (17M), wherein the first unidirectional valve (20M) is arranged upstream of the junction (G); and the second discharge passage (17S) is provided with a second unidirectional valve (second accumulator 20S) for opening and closing the second discharge passage (17S), wherein the second unidirectional valve (20S) is arranged upstream of the junction (G), serves to close the discharge passage of one of the pumps when the other pump is operating, for example, close the first discharge passage (main discharge passage 17M) of the oil pump (main pump 10M) when the oil pump (main pump 10M) is at rest and the auxiliary pump (10S) is operating, and thereby prevent the oil of the inoperative pump upstream of the unidirectional valve (20M, 20S) from flowing out to the control valves and lubricated portions. This serves to keep for a long time a condition that the oil pump (main pump 10M) is fully charged with oil, and allow the oil pump (main pump 10M) to quickly start to operate in response to switching between the oil pump (main pump 10M) and auxiliary pump (10S).

The oil pump comprising a member (oil pump cover 30') adapted to be fixed to a transmission case (1) and formed with a discharge port (35), wherein: the transmission case (1) is coupled to a control valve body (2); and the communication passage (50) is formed to extend through inside of the transmission case (1) and the control valve body (2), is advantageous, because the communication passage (50) is provided without external piping so that this system is not subject to a further requirement in layout.

The oil pump comprising: an oil pump cover (30') formed with a discharge port (35); and a pump housing (13) layered on the oil pump cover (30') so as to define a pump chamber therebetween, wherein: the air vent hole (AM') is constituted by a hole formed in the oil pump cover (30'); and the hole extends from the discharge port (35) in an axial direction of the oil pump cover (30'), makes it possible that when oil pump cover 30' is thick, the connection to first fluid passage 43' can be easily implemented by drilling from the contact surface L of oil pump cover 30' that abuts on pump housing 13, and eliminates the necessity of formation of connection passage 42, and thus simplifies the structure in contrast to the first embodiment.

In the present embodiments, air vent hole AM or AM' is located at the upper end of discharge port 35, because air sucked in main pump 10M tends to converge to the upper end of discharge port 35 so that such a position of air vent hole AM or AM' is advantageous for letting the sucked air out. However, the position of air vent hole AM or AM' may be modified to an arbitrary position at least upstream of discharge outlet 37 while preventing interference with other fluid passages in the oil pump cover. This modification also serves to prevent air from being sent to the control valves and lubricated portions. The sectional area and length of the choke hole or choke groove forming the air vent hole AM or AM' are not limited as described above, but may be modified according to the size of the oil pump, the viscosity of oil, etc.

In the present embodiments, main pump 10M is a type that is arranged on a major shaft of an automatic transmission and is directly rotated by a sleeve of a torque converter. However, main pump 10M is not so limited, but may be a type that is arranged distant from the major shaft of the automatic transmission and is rotated through a chain drive including a sprocket and a chain. Moreover, main pump 10M may be driven by a device other than the engine, for example, by an assist electric motor. In any cases, as shown in the present embodiments, the air vent hole can be communicated with oil in the oil pan through the communication passage which passes through the transmission case and control valve body. In the present embodiments, this structure is applied to the automatic transmission provided with the torque converter. However, this structure may be applied to an automatic transmission provided with no torque converter.

The entire contents of Japanese Patent Application 2010-026220 filed Feb. 9, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An oil pump for an automatic transmission, the automatic transmission comprising:
   an oil an filled with a volume of oil to a predetermined oil level and coupled to a transmission case and a pump cover of the oil pump;
   where the oil pump comprises a suction port connected to a first suction passage, wherein the first suction passage is arranged in parallel with a second suction passage connected to an auxiliary pump, and the first and second suction passages branch from an upstream suction passage leading to an oil strainer submerged in the volume of oil;
   a discharge outlet connected to a first discharge passage;
   the pump cover formed with a discharge port, the discharge port connected to the discharge outlet;
   an air vent hole formed in the oil pump cover disposed downstream of the suction port and upstream of the discharge outlet;
   where the transmission case is coupled to a control valve body; and a communication passage connected to the air vent hole and comprising the control valve body which projects toward a bottom of the oil pan and a lower portion of the control valve body is located below the predetermined oil level in the oil pan so as to communicate the air vent hole with the volume of oil inside the oil pan, where the communication passage is formed to extend through an inside of the transmission case and the control valve body.

2. The oil pump as claimed in claim 1, wherein:
   the first discharge passage is arranged in parallel with a second discharge passage connected to the auxiliary pump;
   the first and second discharge passages join at a junction into a downstream discharge passage;
   the first discharge passage is provided with a first unidirectional valve configured to open and close the first discharge passage, wherein the first unidirectional valve is arranged upstream of the junction; and
   the second discharge passage is provided with a second unidirectional valve configured to open and close the second discharge passage, wherein the second unidirectional valve is arranged upstream of the junction.

3. The oil pump as claimed in claim 2, wherein:
   the first unidirectional valve is arranged to close in response to receipt of oil pressure from the second discharge passage, and to open so as to communicate an upstream side of the first unidirectional valve with a downstream side of the first unidirectional valve in response to a condition that the upstream side is higher in pressure than the downstream side by a predetermined amount; and the second unidirectional valve is arranged to close in response to receipt of oil pressure from the first discharge passage, and to open so as to communicate an upstream side of the second unidirectional valve with a downstream side of the second unidirectional valve in response to a condition that the upstream side of the second unidirectional valve is higher in pressure than the downstream side of the second unidirectional valve by a predetermined amount.

4. The oil pump as claimed in claim 1, comprising a hollow projection constitutes the control valve body.

5. The oil pump as claimed in claim 1, comprising:
a pump housing layered on the oil pump cover so as to define a pump chamber therebetween, wherein:
the air vent hole is constituted by a groove formed in the oil pump cover; and
the groove extends from the discharge port along a surface of the oil pump cover in contact with the pump housing.

6. The oil pump as claimed in claim 1, comprising:
a pump housing layered on the oil pump cover so as to define a pump chamber therebetween, wherein:
the air vent hole extends from the discharge port in an axial direction of the oil pump cover.

* * * * *